(12) United States Patent
Nowoczynski et al.

(10) Patent No.: US 9,798,683 B2
(45) Date of Patent: Oct. 24, 2017

(54) MINIMIZING MICRO-INTERRUPTIONS IN HIGH-PERFORMANCE COMPUTING

(71) Applicant: DataDirect Networks, Inc., Chatsworth, CA (US)

(72) Inventors: Paul Nowoczynski, Brooklyn, NY (US); Michael Vildibill, San Diego, CA (US); Jason Cope, Columbia, MD (US); Pavan Uppu, Laurel, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 481 days.

(21) Appl. No.: 14/274,391

(22) Filed: May 9, 2014

(65) Prior Publication Data

US 2014/0337557 A1 Nov. 13, 2014

Related U.S. Application Data

(60) Provisional application No. 61/822,798, filed on May 13, 2013.

(51) Int. Cl.
  *G06F 13/24* (2006.01)
  *G06F 13/28* (2006.01)
  *G06F 3/06* (2006.01)

(52) U.S. Cl.
  CPC .............. *G06F 13/28* (2013.01); *G06F 3/061* (2013.01); *G06F 3/064* (2013.01); *G06F 3/0689* (2013.01)

(58) Field of Classification Search
  CPC .............. G06F 9/54; G06F 9/544; G06F 13/00
  USPC ........ 710/240–244, 200, 100, 305–306, 313; 711/114, 103; 370/431
  See application file for complete search history.

(56) References Cited

U.S. PATENT DOCUMENTS

2011/0286743 A1* 11/2011 McLaren ............. H04B 10/278 398/45
2014/0032595 A1* 1/2014 Makkar ............. G06F 17/30557 707/770

* cited by examiner

Primary Examiner — Tim T Vo
Assistant Examiner — Kim T. Huynh
(74) Attorney, Agent, or Firm — SoCal IP Law Group LLP; Mark A. Goldstein

(57) ABSTRACT

Data storage systems and methods for storing data in computing nodes of a super computer or compute cluster are described herein. The super computer storage may be coupled with a primary storage system. In addition to a CPU and memory, non-volatile memory is included with the computing nodes as local storage. The super computer includes a plurality of computing groups, each including a plurality of computing nodes. There is one burst buffer fabric per group and one input/output node per group. When data bursts occur, data may be stored by a first computing node on the local storage of a second computing node in the computing group through the burst buffer fabric without interrupting the CPU in the second computing node. Further, the local storage of other computing nodes may be used to store redundant copies of data from a first computing node to make the super computer data resilient.

24 Claims, 4 Drawing Sheets

US 9,798,683 B2

MINIMIZING MICRO-INTERRUPTIONS IN HIGH-PERFORMANCE COMPUTING

RELATED APPLICATION INFORMATION

This patent claims priority from provisional patent application No. 61/822,798 filed May 13, 2013 which is incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data stored in a data storage system and an improved architecture and method for storing data to and retrieving data from local storage in a high speed super computing environment.

Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices. The data may be stored as objects using a distributed data storage system in which data is stored in parallel in multiple locations.

The benefits of parallel file systems disappear when using localized storage. In a super computer, large amounts of data may be produced prior to writing the data to permanent or long term storage. Localized storage for high speed super computers such as exascale is more complex than that of tera and petascale predecessors. The primary issues with localized storage are the need to stage and de-stage intermediary data copies and how these activities impact application jitter in the computing nodes of the super computer. The bandwidth variation between burst capability and long term storage makes the issues challenging.

DETAILED DESCRIPTION

Environment

Super computers store a large quantity of data quickly. It is advantageous to store and make the data available as quickly as possible. To improve super computer throughput blocking or waiting for data to be stored should be reduced as much as possible while at the same time interruptions of computing nodes should be reduced. Storing data in a tiered system in which data is initially stored in an intermediate storage consisting of non-volatile memory (NVM) and then later written to primary storage such as hard disk drives using the architecture described herein helps achieve increased supercomputer throughput. In this way, local storage on each computing node in the form of NVM serves as a burst buffer. This serves to reduce the amount of time computing nodes spend blocking or waiting on data to be written or read. As used herein NVM refers to solid state drives also known as silicon storage devices (SSDs), flash memory, NAND-based flash memory, phase change memory, spin torque memory, and other non-volatile storage that may be accessed quickly compared to primary storage such as hard disk drives. The speed to access local storage NVM is typically an order of magnitude faster than accessing primary storage.

According to the methods described herein, when the computing nodes of a super computer or compute cluster create large amounts of data very quickly, the data is initially stored locally in the computing node in NVM, which may be considered a burst buffer or local storage, before the data is stored in primary storage. The hardware configuration described herein combined with the methods described allow for increased computing throughput and efficiencies as the computing nodes do not need to wait or block when storing or retrieving data; provide for replication and resiliency of data before it is written to primary storage; and allow for access to data from high speed storage even when the local storage on a computing node is down or inaccessible.

Figure 1:
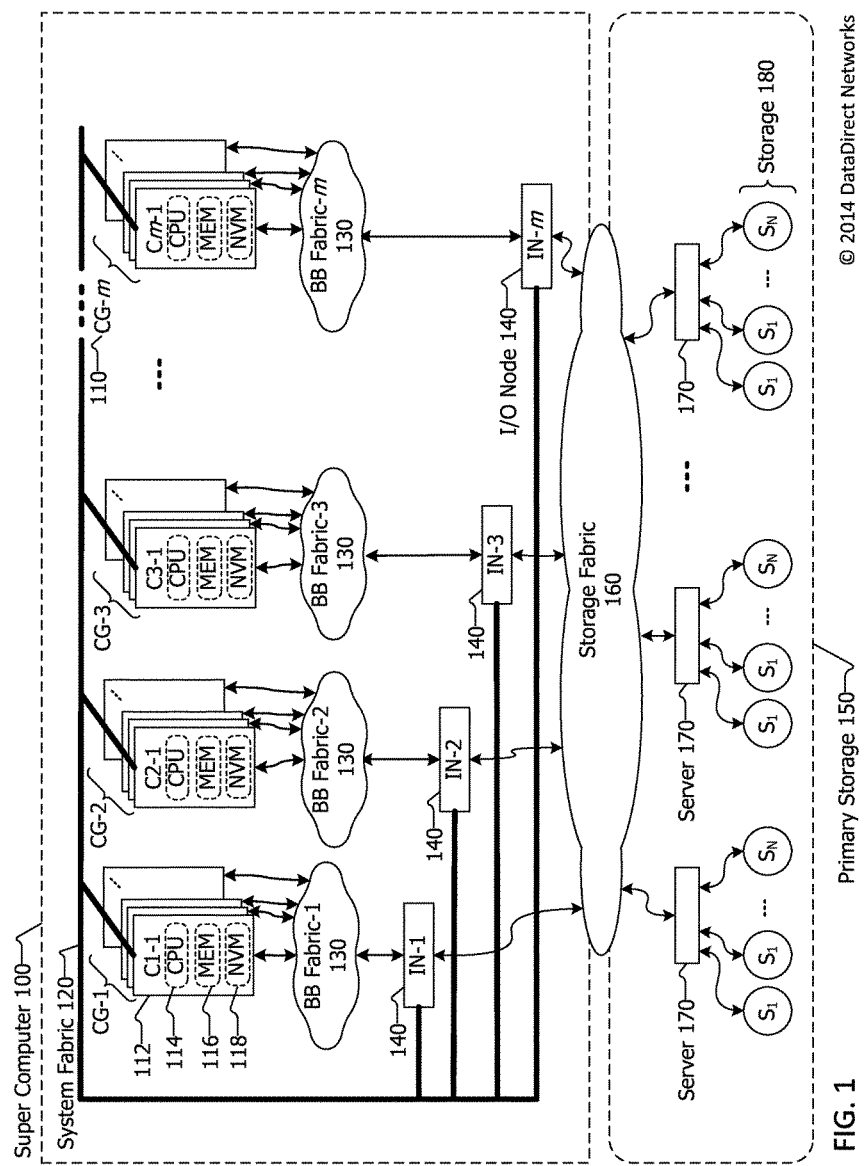
FIG. 1 is a block diagram of a super computing system having local storage accessible to a group of computing nodes, the super computing system coupled with a data storage system.

FIG. 1 is a block diagram of a super computing system 100 having local storage in each computing node 110, the super computing system coupled with a data storage system shown as primary storage 150. The super computer 100 may be a compute cluster that includes a plurality of computing nodes 112 arranged in a plurality of computing groups 110. Similarly, the compute cluster may be a super computer. As shown, computing groups 110 are designated CG-1, CG-2, CG-3 through CG-m. Each computing node is shown as Cm-1, Cm-2, Cm-3 through Cm-n where m refers to the computing group and the number after the dash refers to the computing node within the particular computing group. Each computing node 112 has a CPU 114 with at least one core and may have multiple cores, such as 2, 4, 8, 32, etc. The computing nodes 112 of the super computer each include local memory 116 such as random access memory that may be RAM, DRAM, and the like. Importantly, in the configuration described herein, the computing nodes each include local storage in the form of non-volatile memory (NVM) unit 118. The NVM 118 may be a chip, multiple chips, a chipset or an SSD. Also included in the each computing node 112 is one or more chips or chipsets that support communications over the system fabric 120 and the burst buffer fabric 130.

An advantage of the configuration shown and described herein is that the local storage NVM 118 is included in the computing nodes 112 to increase speed of access to the local storage NVM 118 by the CPU 114 in the same computing group 110. In this configuration, the use of NVM 118, regardless of its location, is accessible to any of the computing nodes 112 in the same computing group 110 over the burst buffer fabric 130. According to the architecture shown in FIG. 1, each of the computing nodes in a computing group may access the local storage included in other computing nodes in the group over the group's burst buffer fabric without interrupting the CPU on the other computing node. There is one burst buffer fabric per computing group. Stated another way, there is a one-to-one correspondence between burst buffers and computing groups. Each of the computing nodes in CG-1 is coupled with BB Fabric-1. Each of the computing nodes in CG-2 is coupled with BB Fabric-2. Each of the computing nodes in CG-m is coupled with BB Fabric-m. The configuration allows for one computing node to access the local storage of any other computing node in the same group via the shared burst buffer fabric. Moreover, this is achieved without interfering with the CPU processing on the other computing node. Each computing node can access the local NVM of other computing nodes in the same computing group without interfering with or interrupting the CPUs on the other computing nodes.

The configuration allows for data redundancy and resiliency as data from one computing node may be replicated in the NVM of other computing nodes. In this way, should the NVM of a first computing node be busy, down or inaccessible, the first computing node can access the needed data from another computing node in the computing group. Moreover, due to the use of the burst buffer fabric, each computing node can access data at other computing nodes in the same group with limited, minimal delay. This configuration provides for robust, non-blocking performing of the computing nodes. This also allows for the handling of bursts such that when the local storage NVM on a first computing node is full, the computing node may access (that is, write to) the local storage NVM on another computing node in the same computing group.

According to configuration shown in FIG. 1, an increase in performance results from the computing nodes being able to access local storage NVM through the burst buffer fabric. When data is spread among the local storage NVM 118 on other computing nodes 112 in the computing group 110, the overhead in processing and management when data from one computing node is written to the NVM of another computing node in the computing group is nearly the same as the time to access local storage NVM on the computing node. This is because the I/O nodes 140 maintain information providing the address of all data stored in the NVM 116 (and the primary storage 150), even when the data is stored in the local storage of the computing node itself. Even when a CPU of one computing node writes data to the local storage NVM of another computing node in the computing group, updating an appropriate I/O node about the write is fast is it occurs over the burst buffer fabric 130.

The burst buffer fabric 130 may conform to a storage device access standard. The storage device access standards may be the serial attached small computer system interface (serial attached SCSI or SAS) standard, peripheral component interconnect express (more commonly known as PCI-EXPRESS®), HYPERTRANSPORT® or other similar storage access or bus standard. The burst buffer fabric manages how computing nodes in the computing group may access the local storage on other computing nodes in the computing group. The burst buffer fabric 130 may be a bus to which each of the computing nodes 112 in a computing group 110 are coupled. Each computing group 110 and the burst buffer fabric 130 may be included in a single rack or shelf in a rack system. The burst buffer fabric 130 is very fast. As such, any delay in a computing node accessing the local storage NVM of another computing node in the computing group is relatively low, and is actually quite fast. As the protocol used on the burst buffer fabric manages access to the local storage NVM, there is no interrupting of the CPU on a second computing node when a first computing node accesses the local storage of the second computing node. The burst buffer fabric 130 handles manages access to the local storage NVM 118, freeing up the CPUs 114 on the computing nodes 112 for other tasks.

The computing nodes 112 may be in one or more racks, shelves or cabinets, or combinations thereof. The computing nodes are coupled with each other over system fabric 120 and burst buffer fabric 130. The computing nodes 112 are coupled with input/output (I/O) nodes 140 via the system fabric 120. The I/O nodes 140 manage data storage. The system fabric 120 is a high speed interconnect that may conform to the INFINIBAND, CASCADE, GEMINI architecture or standard and their progeny, may be an optical fiber technology, may be proprietary, and the like. The burst buffer fabric 130 may be a backplane, high speed bus or other similar communication configuration for supporting a computing group of computing nodes. In one embodiment, the burst buffer fabric conforms to a storage device access standard such as, for example, the serial attached small computer system interface (serial attached SCSI or SAS) standard, peripheral component interconnect express (more commonly known as PCI-EXPRESS®) standard, HYPER-TRANSPORT® standard or other similar storage access or bus standard.

The I/O nodes 140 may be servers which maintain location information for stored data items. There is one I/O node 140 per computing group 110. Each I/O node 140 is coupled with and de facto paired with a corresponding burst buffer fabric 130 for the particular computing group 110. For example, I/O node IN-1 is coupled with computing group CG-1 via BB Fabric-1; I/O node IN-2 is coupled with computing group CG-2 via BB Fabric-2; and I/O node IN-m is coupled with computing group CG-m via BB Fabric-m. The I/O nodes are also coupled with system fabric 120 as well as storage fabric 160.

The I/O nodes keep location information for stored data items in a database. The I/O nodes may also keep track of the amount of data stored at and/or storage available or remaining at local storage of each computing node in the computing group. The database may conform to or be implemented using SQL, SQLITE®, MONGODB®, Voldemort, or other key-value store. That is the I/O nodes store meta data or information about data stored in local storage NVM in the particular computing group. When data is stored in primary storage 150, store a reference to a storage server 170 where the data is located, but not detailed address or other information about the data stored in the primary storage. This serves to keep the database in the I/O nodes 140 small. That is, the database stores information about how to retrieve the data stored in a storage server in the primary storage, but does not include the specific address or other information about the data stored in primary storage. As used herein, meta data is information associated with data that describes attributes of the data. The meta data stored by the I/O nodes 140 may additionally include policy information, parity group information (PGI), data item (or file) attributes, file replay state, and other information about the stored data items. The I/O nodes 140 may be indexed and access the stored meta data according to the hash of meta data for stored data items. The technique used may be based on or incorporate the methods described in U.S. patent application Ser. No. 14/028,292 filed Sep. 16, 2013 entitled Data Storage Architecture and System for High Performance Computing.

Each of the I/O nodes 140 is coupled with the system fabric 120 over which the I/O nodes 140 receive data storage (that is, write or put) and data access (that is, read or get) requests from computing nodes 110. The I/O nodes 140 manage the distribution of data items from the super computer 100 so that data items are spread evenly across the primary storage 150. Each of the I/O nodes 140 is coupled with the storage fabric 160 over which the I/O nodes 140 send data storage and data access requests to the primary storage 150 via a network 160. The storage fabric 160 spans both the super computer 100 and primary storage 150 or be included between them.

The primary storage 150 typically includes multiple storage servers 170 that are independent of one another. The storage servers 170 may be in a peer-to-peer configuration. The storage servers may be geographically dispersed. The storage servers 170 and associated storage devices 180 may replicate data included in other storage servers. The storage servers 170 may be separated geographically, may be in the same location, may be in separate racks, may be in separate buildings on a shared site, may be on separate floors of the same building, and arranged in other configurations. The storage servers 170 communicate with each other and share data over storage fabric 160. The servers 170 may augment or enhance the capabilities and functionality of the data storage system by promulgating policies, tuning and maintaining the system, and performing other actions.

The storage fabric 160 may be a local area network, a wide area network, or a combination of these. The storage fabric 160 may be wired, wireless, or a combination of these. The storage fabric 160 may include wire lines, optical fiber cables, wireless communication connections, and others, and may be a combination of these and may be or include the Internet. The storage fabric 160 may be public or private, may be a segregated network, and may be a combination of these. The storage fabric 160 includes networking devices such as routers, hubs, switches and the like.

The term data as used herein includes multiple bits, multiple bytes, multiple words, a block, a stripe, a file, a file segment, or other grouping of information. In one embodiment the data is stored within and by the primary storage as objects. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

The I/O nodes 140 and servers 170 are computing devices that include software that performs some of the actions described herein. The I/O nodes 140 and servers 170 may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the servers may include various specialized units, circuits, software and interfaces for providing the functionality and features described herein. The processes, functionality and features described herein may be embodied in whole or in part in software which operates on a controller and/or one or more I/O nodes 140 and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or server, and others by other controllers or servers.

A computing device as used herein refers to any device with a processor, memory and a storage device that may execute instructions such as software including, but not limited to, server computers. The computing devices may run an operating system, including, for example, versions of the Linux, Unix, MS-DOS, MICROSOFT® Windows, Solaris, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND network, Fibre Channel, and others. A computing device with a network interface is considered network capable.

Referring again to FIG. 1, each of the storage devices 180 include a storage medium or may be an independent network attached storage (NAS) device or system. The term "storage media" is used herein to refer to any configuration of hard disk drives (HDDs), solid-state drives (SSDs), silicon storage devices, magnetic tape, or other similar magnetic or silicon-based storage media. Hard disk drives, solid-states drives and/or other magnetic or silicon-based storage media 180 may be arranged according to any of a variety of techniques.

The storage devices 180 may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2, 3 and 4 terabytes. Example hard disk drive specifications include Serial Attached Small Computer System Interface (SAS), Serial Advanced Technology Attachment (SATA), and others. An example server 170 may include 16 three terabyte 3.5" hard disk drives conforming to the SATA standard. In other configurations, there may be more or fewer drives, such as, for example, 10, 12, 24, 32, 40, 48, 64, etc. In other configurations, the storage media 180 in a storage node 170 may be hard disk drives, silicon storage devices, magnetic tape devices, optical media or a combination of these. In some embodiments, the physical size of the media in a storage node may differ, and/or the hard disk drive or other storage specification of the media in a storage node may not be uniform among all of the storage devices in primary storage 150.

The storage devices 180 may be included in a single cabinet, rack, shelf or blade. When the storage devices 180 in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage devices according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

The rack, shelf or cabinet containing a storage zone may include a communications interface that allows for connection to other storage zones, a computing device and/or to a network. The rack, shelf or cabinet containing storage devices 180 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing storage devices may include a network interface chip, chipset, card or device that allows for communication over a wired and/or wireless network, including Ethernet, namely storage fabric 160. The controller and/or the backplane may provide for and support 1, 2, 4, 8, 12, 16, etc. network connections and may have an equal number of network interfaces to achieve this.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks and tape, flash memory, and optical disks such as CDs, DVDs and BLU-RAY® discs and other optically accessible media.

In some embodiments, files and other data may be partitioned into smaller portions and stored as multiple objects in the primary storage 150 and among multiple storage devices 180 associated with a storage server 170. Files and other data may be partitioned into portions referred to as objects and stored among multiple storage devices. The data may be stored among storage devices according to the storage policy specified by a storage policy identifier. Various policies may be maintained and distributed or known to the servers 170 in the primary storage 150. The storage policies may be system defined or may be set by applications running on the computing nodes 110.

As used herein, storage policies define the replication and placement of data objects in the data storage system. Example replication and placement policies include, full distribution, single copy, single copy to a specific storage device, copy to storage devices under multiple servers, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies.

The local storage NVM 118 included in the computing devices 112 may be used to provide replication, redundancy and data resiliency within computing groups 110 of the super computer 100. In this way, according to certain policies that may be system pre-set or customizable, the data stored in the NVM 118 of one computing node 110 may be stored in whole or in part on one or more other computing nodes 110 of the super computer 100. Partial replication as defined below may be implemented in the NVM 118 of the computing nodes 112 of the super computer 100 in a synchronous or asynchronous manner. The primary storage system 150 may provide for one or multiple kinds of storage replication and data resiliency, such as partial replication and full replication.

As used herein, full replication replicates all data such that all copies of stored data are available from and accessible in all storage. When primary storage is implemented in this way, the primary storage is a fully replicated storage system. Replication may be performed synchronously, that is, completed before the write operation is acknowledged; asynchronously, that is, the replicas may be written before, after or during the write of the first copy; or a combination of each. This configuration provides for a high level of data resiliency. As used herein, partial replication means that data is replicated in one or more locations in addition to an initial location to provide a limited desired amount of redundancy such that access to data is possible when a location goes down or is impaired or unreachable, without the need for full replication. Both the local storage NVM 118 and the primary storage 150 support partial replication.

In addition, no replication may be used, such that data is stored solely in one location. However, in the storage devices 180 in the primary storage 150, resiliency may be provided by using various techniques internally, such as by a RAID or other configuration.

Processes

Figure 2:
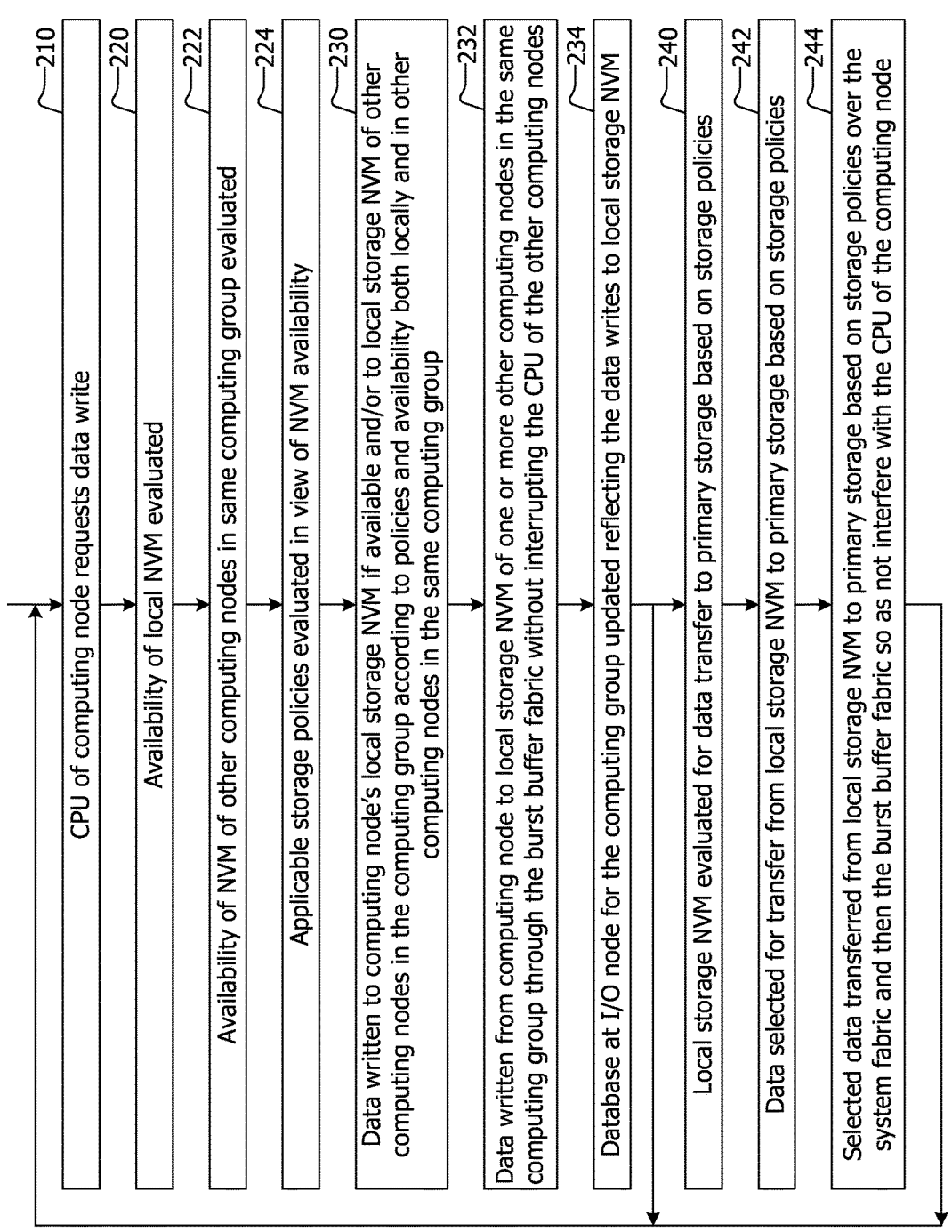
FIG. 2 is a flow chart of actions taken by a computing node of a super computer or computing cluster to store or put data.

FIG. 2 is a flow chart of actions taken by a computing node of a super computer or computing cluster to store or put data in a data storage system. This method is initiated and executed by an application or other software running on each computing node. The CPU of a computing node requests data write, as shown in block 210. The availability of local NVM or local storage is evaluated, as shown in block 220. The check for NVM availability may include one or more of checking for whether the NVM is full, is blocked due to other access occurring, is down or has a hardware malfunction, or is inaccessible for another reason. The availability of NVM of other computing nodes is also evaluated, as shown in block 222. The availability of local storage NVM at at least one of the other computing nodes in the super computer is evaluated. The number of computing nodes evaluated may be based on a storage policy for the super computer or a storage policy for the data, and may be system defined or user customizable. This evaluation may be achieved by the application or other software running on the CPU of a computing node 110 querying an I/O node 140 to obtain one or more identifiers of local storage in computing nodes in the same computing group with available local storage NVM. This communication may be short and simple, amounting to a general request for local storage at another computing node in the computing group. This communication may include or be a query or request for the address of local storage in another computing node in the same computing group having a specific amount of known or anticipated needed storage space available. In some embodiments, the request for available storage may include a designation of whether the available storage may be split among two or more other computing nodes or must be included in a single computing node in the computing group.

Applicable storage policies are evaluated in view of NVM availability, as shown in block 224. For example, the evaluation may include considering when partial replication to achieve robustness and redundancy is specified, one or more the number of NVM units at other computing nodes in the computing group is selected as targets to store the data stored in local storage NVM. The evaluation may include considering when partial replication to achieve robustness and redundancy is specified, and the local storage NVM is not available, two or more local storage NVM units at other computing nodes in the computing group are selected as targets to store the data. The evaluation may include considering when no replication is specified and the local storage NVM is available, no NVM units at other computing nodes in the computing group are selected to store the data stored in local storage NVM. Other storage policy evaluations in view of NVM available at other computing nodes in the computing group may be performed.

Data is written to the computing node's local storage NVM if available and/or to local storage NVM of one or more other computing nodes in the computing group according to policies and availability of local storage NVM both locally and in the other computing nodes in the same computing group, as shown in block 230. The computing node may be considered a source computing node the other computing nodes in the computing group may be considered target or destination computing nodes. Data is written from the computing node to the local storage NVM of one or more other computing nodes in the same computing group through the burst buffer fabric without interrupting the CPU of the other computing nodes, as shown in block 232. More specifically, when data is to be stored in the local storage NVM of one or more other computing nodes in the computing group, data is written from the local storage NVM of the source computing node to the local storage NVM of one or more target computing nodes in the computing group via the burst buffer fabric without communicating with or otherwise interrupting the CPU on the target computing node. Similarly, when data is to be stored in the local storage NVM of one or more other computing nodes in the computing group and the local storage NVM of the computing node is unavailable or inaccessible, data is written from the local memory of the source computing node to the local storage NVM of one or more destination computing nodes in the computing group via the burst buffer fabric. According to the methods and architecture described herein, when a write is made, a one to one communication between the source and destination computing nodes occurs over the burst buffer fabric such that no intermediary or additional computing nodes are involved in the communication from source to destination over the burst buffer fabric.

In one embodiment, the system may in addition or alternatively write to the local storage of computing nodes in other computing groups over the system fabric. This may be achieved by the computing node sending a write request to the I/O node in its computing group and specifying that data be written to another computing group. This may be achieved by the computing node sending a write request to the I/O node in the computing group, and the I/O node determining that it is better or preferable to write the data to another computing group. This could be for any of a number of reasons as determined by the I/O node, including because of traffic or other performance degradation of the local burst buffer fabric or if local storage of all computing nodes in the computing group are full or near full.

After a write is made to local storage NVM as shown in blocks 230 and 232, the database at the I/O node for the computing group is updated reflecting the data writes to local storage NVM, as shown in block 234. This may be achieved be a simple message from the computing node to the I/O node over the burst buffer fabric or system fabric reporting data stored and location stored, which causes the I/O node for the computing group to update its database. The flow of actions then continues back at block 210, described above, or continues with block 240.

Referring now to block 240, the application or other software executing on the CPU in a computing node evaluates local storage NVM for data transfer to primary storage based on storage policies. This evaluation includes a first computing node evaluating its local storage NVM and, if applicable, the local storage NVM of other computing nodes in the same computing group written to by the first computing node. The policies may be CPU/computing node policies and/or policies associated with the data items stored in the local storage NVM. The policies may be based on one or a combination of multiple policies including send oldest data (to make room for newest data); send least accessed data; send specially designated data; send to primary storage when CPU quiet, not executing; and others. Data is selected for transfer from the local storage NVM to the primary storage based on storage policies, as shown in block 242. This selection is made by software executing on a first computing node evaluating its local storage NVM and, if applicable, the local storage NVM of other computing nodes in the same computing group written by the first computing node. The selected data is transferred from local storage NVM to primary storage based on storage policies over the system fabric and then the burst buffer so as not to interrupt the CPU on the computing node, as shown in block 244.

Figure 3:
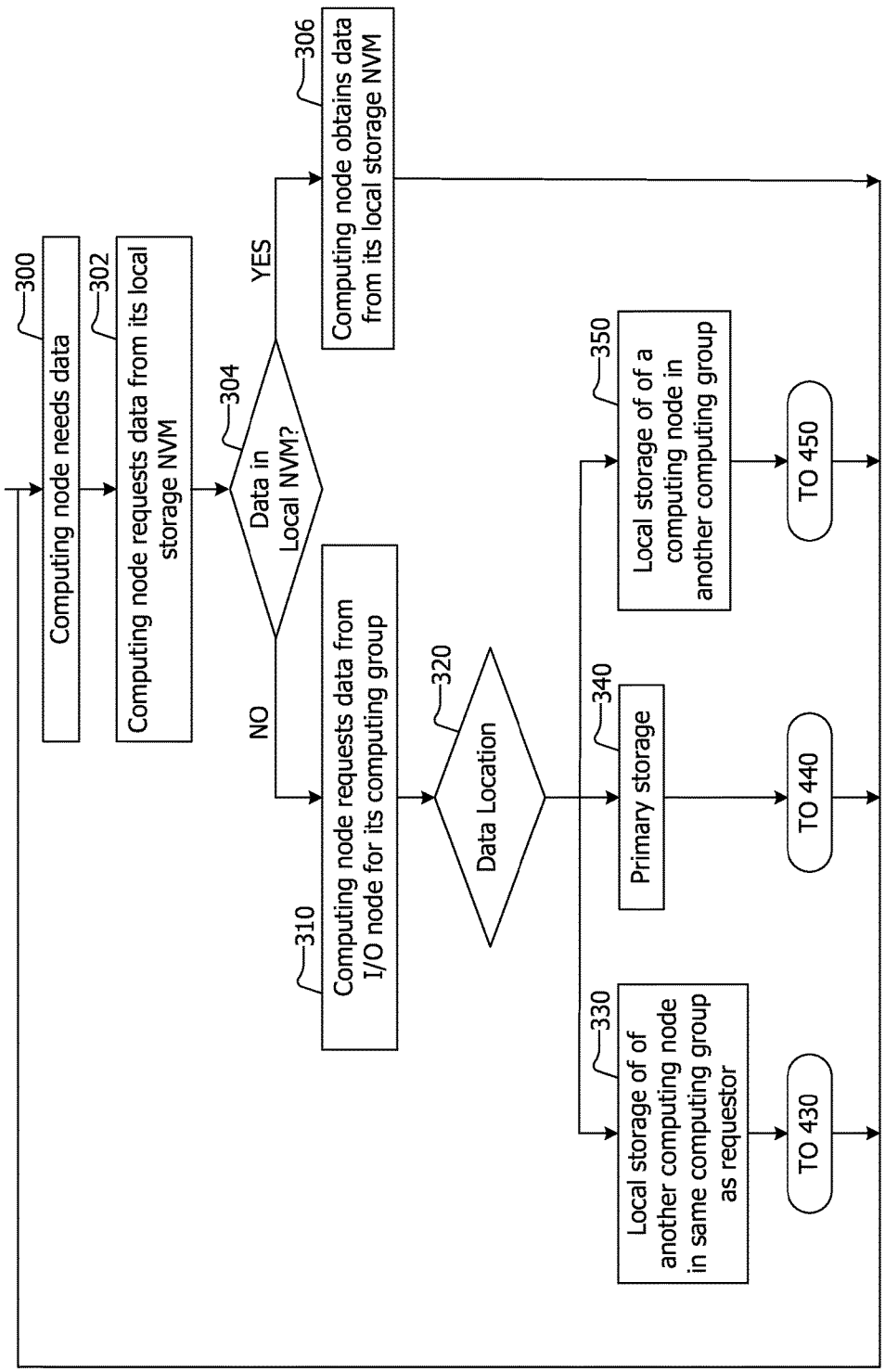
FIG. 3 is a flow chart of actions taken by a computing node of a super computer or computing cluster to read or get data.

FIG. 3 is a flow chart of actions taken by a computing node of a super computer or computing cluster to read or get data. An application executing on a computing node needs data, as shown in block 300. The computing node requests data from its local storage NVM, as shown in block 302. A check is made to determine if the data is located in the local storage NVM on the computing node, as shown in block 304. When the data is located in the local storage NVM on the computing node, as shown in block 304, the computing node obtains the data from its local storage NVM as shown in block 306. The flow of actions then continues at block 300.

When the data is not located in the local storage NVM on the computing node, as shown in block 304, the computing node requests data from the I/O node for its computing group, as shown in block 310. This is achieved by sending a data request over the burst buffer fabric 120 to the I/O node 140. The burst buffer fabric is used to ensure speedy receipt of the location of the requested data.

The I/O node checks its database to determine the location of the requested data, as shown in block 320. When the data is in local storage of another computing node in the same computing group as the requestor (block 330), the flow of actions continues in block 430 of FIG. 4. When the data is in primary storage (block 340), the flow of actions continues in block 440 of FIG. 4. When the data is in local storage of a computing node in another computing group (block 350), the flow of actions continues in block 450 of FIG. 4.

Figure 4:
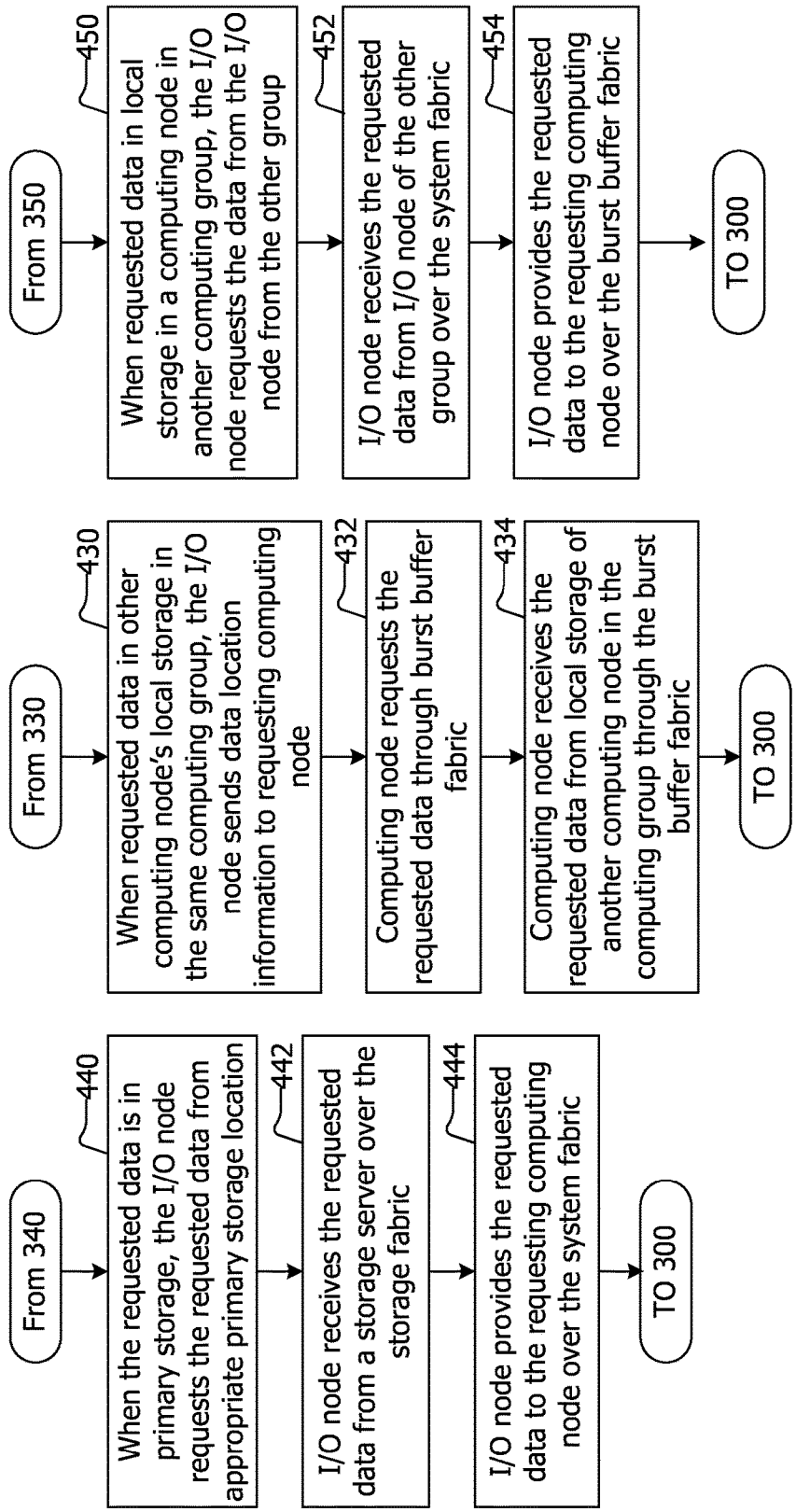
FIG. 4 is a flow chart of actions taken by a computing node of a super computer or computing cluster to read or get data in continuation of FIG. 3.

Referring now to FIG. 4. When the requested data is in primary storage, the requested data is obtained from the primary storage. That is, when the requested data is in primary storage, as shown in block 440, the I/O node requests the requested data from an appropriate primary storage location, as shown in block 330. This is achieved by the I/O node sending a request over the storage fabric 160 to an appropriate storage server 170. The I/O node receives the requested data from a storage server over the storage fabric, as shown in block 442. The I/O node provides the requested data to the requesting computing node via the system fabric, as shown in block 444. The flow of actions returns to block 300 of FIG. 3.

When the requested data is not in primary storage, (and not in local storage NVM of the requesting computing node, as shown in block 304), the requested data may be located in local storage of another computing node in the computing group. When the requested data is in another computing node's local storage NVM in the computing group, the I/O node looks up the location of the requested data in its database and sends the local storage NVM location information for the requested data to the requesting computing node, as shown in block 430. The computing node obtains the requested data through the burst buffer fabric from the local storage of the other computing node without interrupting or otherwise interfering with the CPU of the other computing node, as shown in block 432. This allows for fast retrieval of the needed data over the computing group's burst buffer fabric. The computing node receives the requested data from the local storage of another computing node in the computing group over the burst buffer fabric without interrupting the CPU on the other computing node, as shown in block 434. When a read is made from local storage of another computing in the same computing group, a one to one communication between the requesting computing node and the local storage on the other computing node in the computing group occurs such that no intermediary or additional computing nodes are involved in the communication over the burst buffer fabric.

When the requested data is in local storage NVM of a computing node in another computing group, the I/O node requests the data from the I/O node from the other group, as shown in block 450. The computing node receives the requested data from the I/O node of the other group over the system fabric, as shown in block 452. This is achieved by the other I/O node via that groups burst buffer fabric without interrupting or otherwise interfering with the CPU of the other computing node in the other computing group. The I/O node provides the requested data to the requesting computing node over the burst buffer fabric, as shown in block 454. The actions of blocks 450, 452 and 454 may be achieved using a distributed hash table according to the methods described in U.S. patent application Ser. No. 14/028,292 filed Sep. 16, 2013 entitled Data Storage Architecture and System for High Performance Computing.

As described in FIGS. 2, 3 and 4, the actions taken in the configuration shown in FIG. 1 provide for handling of data bursts such that when the local storage on one computing node is full or unavailable, the computing node may access (that is, write to) the local storage of another computing node in the computing group over the burst buffer fabric. This allows for robust, non-blocking performance of computing nodes, reducing micro-interruptions when data intensive computations are performed by the computing nodes of a super computer. In addition, using the methods set forth herein with the architecture that includes a burst buffer fabric per computing group of computing nodes and local storage at each computing node, the supercomputer provides for fast performing data resiliency by redundancy of the data among computing nodes in a computing group.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage method comprising:
a CPU of a first computing node of a super computer issuing a data write request;
evaluating an availability of local storage in the first computing node;
evaluating an availability of local storage in at least one other computing node of a plurality of computing nodes configured as a computing group in which the first computing node is a member, including querying an input/output node for the computing group to obtain an identifier of the at least one other computing node in the same computing group with available local storage;
evaluating storage policies in view of the evaluating the availability of local storage in the first computing node and the evaluating the availability of local storage in the at least one other computing node in the computing group;
writing data to local storage of at least one of the other computing nodes in the computing group according to the storage policies and the availability of local storage both in the first computing node and in other computing nodes, including writing data from the first computing node to the local storage of the at least one other computing node through a burst buffer fabric such that a CPU in the at least one other computing node is not interrupted, wherein the burst buffer fabric conforms to a storage device access standard.

2. The data storage method of claim 1 wherein the local storage is non-volatile memory.

3. The data storage method of claim 2 wherein the non-volatile memory is silicon-based.

4. The data storage method of claim 1 wherein the storage device access standard is one of a serial attached small computer system interface (SAS) standard or a peripheral component interconnect express (PCI-EXPRESS) standard.

5. The data storage method of claim 1 wherein the evaluating the querying includes requesting an address of local storage in another computing node in the computing group having a specified amount of storage space available.

6. The data storage method of claim 1 wherein the evaluating the availability of local storage in the first computing node comprising checking whether the local storage is accessible and/or full.

7. The data storage method of claim 1 further comprising:
reporting location information of data written to local storage in the at least one other computing node to the input/output node.

8. The data storage method of claim 7 wherein the reporting the location information to the input/output node is achieved over one of a system fabric and the burst buffer fabric.

9. A data retrieval method comprising:
a first computing node of a plurality of computing nodes of a computing group checking whether needed data is in its local storage;
when the data is not available from the local storage of the first computing node, the first computing node requesting the data from an I/O node for the computing group;
when the data is not in primary storage, the first computing node receiving from the I/O node a location of a second computing node of the computing group where the needed data is located;
the first computing node requesting the needed data through a burst buffer fabric from the second computing node, wherein the burst buffer fabric connects all of the computing nodes in the computing group with each other and with the I/O node of the computing group, and wherein the burst buffer fabric conforms to a storage device access standard;
the first computing node receiving the requested data from the second computing node over the burst buffer fabric such that a CPU in the second computing node is not interrupted.

10. The data retrieval method of claim 9 wherein checking whether needed data is in local storage includes checking whether the local storage is accessible.

11. The data retrieval method of claim 9 wherein the local storage is non-volatile memory.

12. The data retrieval method of claim 9 wherein the non-volatile memory is silicon-based.

13. The data retrieval method of claim 9 wherein the storage device access standard is one of a serial attached small computer system interface (SAS) standard or a peripheral component interconnect express (PCI-EXPRESS) standard.

14. The data retrieval method of claim 9 further comprising:
when the data is in the primary storage, the I/O node requesting the requested data from an appropriate primary storage location,
receiving the requested data to from a storage server,
providing the requested data to the requesting computing node.

15. The data retrieval method of claim 14 wherein the providing the requested data to the requesting computing node is achieved over a system fabric.

16. A super computer comprising:
a plurality of computing groups, each computing group having a plurality of computing nodes, each computing node including a CPU, a memory, a local storage, and a communications unit;
a plurality of input/output nodes corresponding to a number of computing groups;
a system fabric over which the computing nodes communicate with each other and with the input/output nodes, wherein the system fabric is a high speed interconnect, such that there is one system fabric for the super computer;
a plurality of burst buffer fabrics corresponding to the number of computing groups over which the computing nodes in a particular computing group communicate with each other and with the input/output node for the computing group, wherein the burst buffer fabric conforms to a storage device access standard,
wherein each of the plurality of computing nodes in one computing group are configured to access the local storage of other computing nodes in the one computing group via the burst buffer fabric for the one computing group without interrupting the CPUs in the other computing nodes in the one computing group.

17. The super computer of claim 16 wherein the local storage is non-volatile memory.

18. The super computer of claim 16 wherein the non-volatile memory is silicon-based.

19. The super computer of claim 16 wherein the storage device access standard is one of a serial attached small computer system interface (SAS) standard or a peripheral component interconnect express (PCI-EXPRESS) standard.

20. The super computer of claim 16 wherein the memory is random access memory (RAM).

21. The super computer of claim 16 wherein the high speed interconnect conforms to one of INFINIBAND, CASCADE, GEMINI standards.

22. The super computer of claim 16 wherein the high speed interconnect is one of wired or fiber optic.

23. The super computer of claim 16 wherein the input/output node is a server computer.

24. The super computer of claim 16 wherein the input/output nodes each include a database to store location information for stored data.

* * * * *